United States Patent [19]

Schmitt et al.

[11] Patent Number: 4,590,967

[45] Date of Patent: May 27, 1986

[54] GLADHAND WITH BUILT-IN DIRT PROTECTION PLUG

[75] Inventors: Eugene W. Schmitt, Lockport; Michael R. Stoltenberg, Des Plaines, both of Ill.

[73] Assignee: Sloan Valve Company, Franklin Park, Ill.

[21] Appl. No.: 767,041

[22] Filed: Aug. 19, 1985

Related U.S. Application Data

[63] Continuation of Ser. No. 468,155, Feb. 22, 1983, abandoned.

[51] Int. Cl.[4] .................... F16K 37/00

[52] U.S. Cl. .................... 137/613; 137/381; 137/494; 137/509; 137/556

[58] Field of Search .................... 137/494, 509, 613, 556, 137/381

[56] References Cited

U.S. PATENT DOCUMENTS

| | | | |
|---|---|---|---|
| 2,891,570 | 6/1959 | Krupp | 137/509 |
| 2,954,047 | 9/1960 | Faltejsek et al. | 137/556 |
| 2,962,045 | 11/1960 | Christensen | 137/509 |
| 3,245,428 | 4/1966 | Klimak et al. | 137/493 |
| 3,410,304 | 11/1968 | Pahl, Jr. | 137/494 |
| 3,960,365 | 6/1976 | Horowitz | 251/286 |
| 4,109,673 | 8/1978 | Horowitz et al. | 251/96 |

*Primary Examiner*—A. Michael Chambers
*Attorney, Agent, or Firm*—Kinzer, Plyer, Dorn & McEachran

[57] ABSTRACT

A combination gladhand and dirt protection plug includes a gladhand body with a chamber within the body. There are a pair of air ports in communication with the chamber, with one of the ports functioning as an air inlet. A seal is positioned in one of the air ports and there is a dirt protection plug movable in the chamber toward and away from the seal to open and close said one port. A spring is positioned within the body to bias the plug toward a port closing position. The plug has a surface in communication with the air inlet, with air pressure at the inlet, applied to the plug surface, causing the plug to automatically move against the spring and away from the seal to an open position.

1 Claim, 2 Drawing Figures

63 61 46 56 10 48 50 52 32 62 58 36 44 54 34 60 16 12 18 14 30 28 42 26 20 22 38 40 24

63
61
46
56
10
44
54
48
34
60
50
16
52
32
62
12
58
36
18
14
30
28
42
26
20
22
38
40
24

70
86
88
102
80
100
82
84
98
76
99
78
94
72
90
92
74
96

GLADHAND WITH BUILT-IN DIRT PROTECTION PLUG

This application is a continuation of our prior application Ser. No. 468,155, filed Feb. 22, 1983 now abandoned.

SUMMARY OF THE INVENTION

The present invention relates to gladhands of the type used in tractor and/or trailer applications and has particular application to a gladhand construction including a built-in dirt protection plug which automatically opens when air is applied at the gladhand inlet.

A primary purpose of the invention is a simply-constructed reliably operable gladhand with a built-in dirt protection plug.

Another purpose is a gladhand with built-in dirt protection plug in which air may be admitted to the gladhand structure at either one of two ports.

Another purpose is a gladhand with built-in dirt protection plug in which the direction of flow may be in either of two directions through the gladhand body.

Another purpose is a gladhand of the type described, with a built-in dirt protection plug, which plug is normally urged toward a closing position by a spring within the gladhand, and which plug automatically opens upon the application of air pressure at the gladhand inlet.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present application describes a combination gladhand and dirt protection plug which finds particular application in over-the-road vehicles and has utility as a part of the air system connecting a tractor to a trailer and/or connecting one trailer to a following trailer. In the trade the following trailer is known as a full trailer, whereas, the trailer mounted upon a tractor is known as a semi-trailer. The gladhand construction shown has application within the air system of such vehicles and although only a portion of the gladhand construction is illustrated, it is well known in the art that there is a further fitting required in the complete gladhand construction. But for simplicity in description, only a portion of the gladhand construction is shown and described herein.

Reference is made to the following U.S. Pat. Nos. which illustrate similar types of gladhand constructions: 4,109,673, 3,960,365 and 3,245,428.

Figure 1:
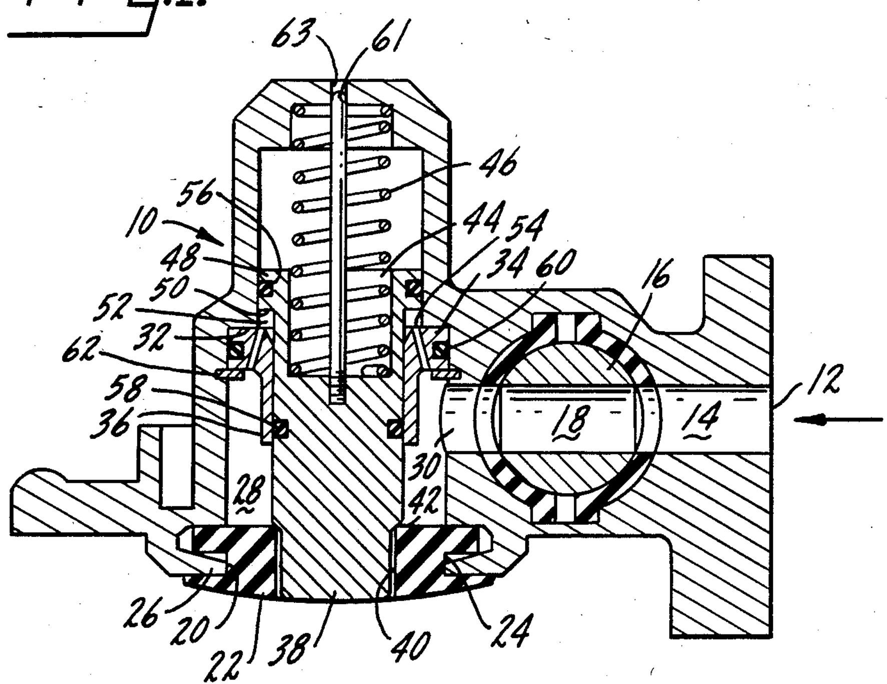
FIG. 1 is an axial section through one form of combination gladhand and dirt protection plug.

In the structure illustrated in FIG. 1, a gladhand body is illustrated at 10 and has an air inlet 12 which is connected, through a passage 14, with a shutoff valve 16. The shutoff valve will have a stem and handle extending outwardly from the gladhand body or housing 10 so that the valve may be moved from the open position illustrated in FIG. 1 to a closed position in which valve 16 has been rotated such that its internal passage 18 is at 90 degrees to the illustrated position. Gladhand body 10 has an air outlet port 20 which is closed by a seal member 22 of the type conventional in gladhand construction. Seal 22 has a peripheral groove 24 defining flange areas which fit on opposite sides of a gladhand body flange 26, thereby securing the seal within air outlet port 20.

Positioned within gladhand body 10 is a chamber 28 which is in communication with air outlet 20 and is in communication with shutoff valve 16 by a short air passage 30.

Positioned within chamber 28 and mounted upon a shoulder 32 thereof is a collar 34 having an outwardly-extending flange seated upon the shoulder and a coaxial guide portion 36 which mounts a dirt protection plug 38. Plug 38 is coaxially aligned with opening 40 in seal 22 and, in the position of FIG. 1, closes opening 40 within the seal. Dirt protection plug 38 has a shoulder 42 which in the closed position is seated against the portion of seal 22 surrounding seal opening 40 to provide the closure thereof.

Dirt protection plug 38 has an internal chamber 44 mounting a coil spring 46, bottomed upon a portion of gladhand housing 10, which spring urges the dirt protection plug to the closed position of FIG. 1. Plug 38 further has an outwardly-extending annular flange 48 which defines a surface 50 spaced from the lower surface of collar 34. Defined between the collar and the surface 50 is a chamber 52 which, through a plurality of collar passages 54, is in communication with the main portion of chamber 28 and thus with air passage 30 and air outlet 40. Flange 48 of plug 38 may have a seal 56 which bears against the side of chamber 52 and a further seal 58 which bears against guide portion 36 of collar 32. Similarly, the outwardly extending flange of collar 34 may have a seal 60 which bears against the side of chamber 28. A ring or the like 62 is positioned within a slot in the chamber wall and is used to mount collar 34. An indicator rod 61 is attached to plug 38 and extends outwardly from body opening 63 when the valve is open.

In operation, the direction of air flow is from air inlet 12, through the shutoff valve 16, if open, then through passage 30 and into chamber 28. At such time as shutoff valve 16 is moved from a closed position to an open position, the air pressure admitted into chamber 28 will pass through passages 54 and into chamber 52 between collar 34 and flange 48 of the dirt protection plug. In the normally closed position of the gladhand, the dirt protection plug is in the position of FIG. 1, thus closing the central passage 40 of seal 22. However, when shutoff valve 16 is open, as described, air pressure from the inlet will be admitted into chamber 52 and will provide an air pressure-created force upon surface 50 of the dirt protection plug. This will cause the dirt protection plug to move, against the force of spring 46, whereby the plug is moved away from the central passage 40 in seal 22. Thus, at such time as shutoff valve 16 is opened, the dirt protection plug automatically retracts from its closed position with seal 22.

When shutoff valve 16 is closed, as it would be when there is no longer pressure applied through the gladhand spring 46 will urge the dirt protection plug back to the closed position of FIG. 1. Air pressure within chamber 52 will bleed through passages 54 back into the main portion of chamber 28 and then out of seal passage 40. The closure of the valve will be at such a rate as to permit the bleeding of air pressure within the chambers so that the spring may in fact move the dirt protection plug to the closed position.

The dirt protection plug is advantageous and necessary to keep impurities which may be in the air supply, such as bugs, dirt, and other miscellaneous material, out of the valves which are normally positioned downstream of the gladhand. Thus, the air system of the tractor trailer combination is protected by the dirt protection plug which automatically closes when the air supply through the gladhand is shut off.

Figure 2:
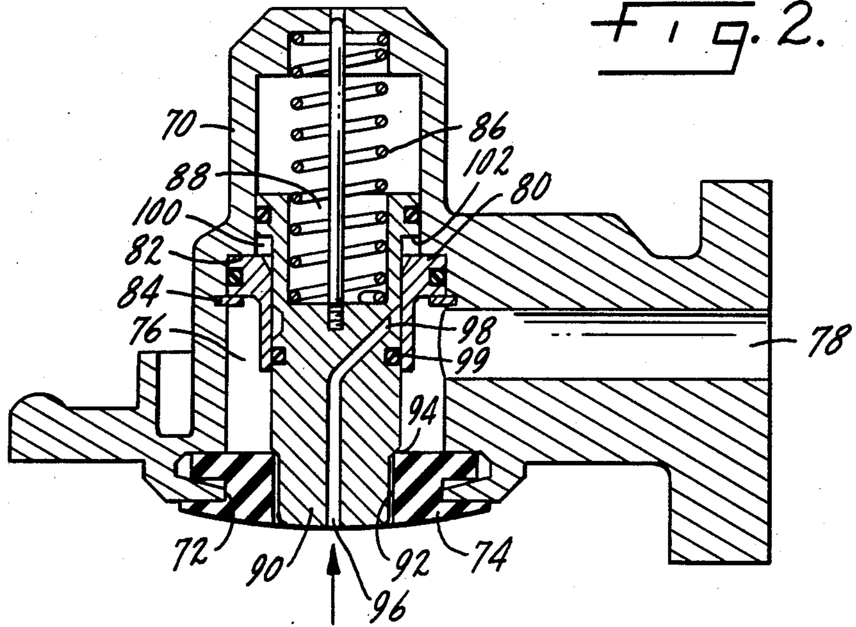
FIG. 2 is an axial section, similar to FIG. 1, but showing a modified form of valve, with air flow being in the opposite direction from FIG. 1.

In the FIG. 2 construction, there is no shutoff valve and the direction of air flow is opposite to that illustrated in FIG. 1. A gladhand body is indicated at 70 and has an air inlet 72 filled by a seal 74 mounted in the same manner as illustrated in FIG. 1. A chamber 76 is formed within body 70 and the air outlet from the chamber is indicated at 78.

A collar 80, similar to the collar of FIG. 1, is again positioned within chamber 76 and mounted on a shoulder 82 of the gladhand body, with the collar being held in position by a mounting ring 84.

A coil spring 86 is positioned, at least in part, within a chamber 88 in dirt protection plug 90 which, in the illustrated closed position of FIG. 2, closes central passage 92 of seal 74. Again, a shoulder 94 on the dirt protection plug provides the sealing engagement with seal 74. An indicating rod may again be attached to the valve plug as in FIG. 1.

Dirt protection plug 90 has a central passage 96 which opens at the exterior of seal 74 in gladhand body 70 and terminates, in an annular groove 98, in facing relationship with collar 80. A seal 99 is positioned between plug 90 and collar 80. The fit between the collar and the dirt protection plug below seal 99 is not tight and thus air pressure from groove 98 will leak between the mating surfaces of these two elements to reach a chamber 100 formed between opposing surfaces of the dirt protection plug and the collar, similar to the chamber 52 illustrated in FIG. 1. Both the dirt protection plug and the collar have the same seals as described in connection with FIG. 1.

In operation, FIG. 2 illustrates the closed position in which the dirt protection plug fills the opening in the gladhand seal. There is no supply of air at the air inlet in the closed position of the valve illustrated in FIG. 2. When air is supplied to the gladhand, since port 72 functions as an inlet, such air will initially be supplied to the facing surface of dirt protection plug 90. Such air will pass through passage 96 and to its terminating groove 98. The air will then pass between the mating surfaces of the dirt protection plug and collar to reach chamber 100. Air within chamber 100 will act upon surface 102 of dirt protection plug 90 to move the dirt protection plug, against the force of spring 86, to an open position. Thus, whenever air pressure is supplied to the gladhand, the dirt protection plug will automatically retract, permitting air to flow from gladhand inlet 72 to the outlet passage 78.

At such time as air pressure is removed from the gladhand inlet, spring 86 will automatically return the dirt protection plug to the closed position of FIG. 2. During such closure, air pressure within chamber 100 will bleed between the mating surfaces of the dirt protection plug and collar, through passage 96 to the exterior of the gladhand.

Of importance in the invention is the automatic operation of the dirt protection plug. Whenever air pressure is supplied to the gladhand, the dirt protection plug, normally in a closed position, will automatically retract, permitting the free flow of air pressure through the gladhand construction. The dirt protection plug automatically closes when the air supply to the gladhand is removed. Thus, the dirt protection plug will prevent impurities in the air supply from passing beyond the gladhand. By closing the inlet to the gladhand, any valves or reservoirs downstream of the gladhand are protected from impurities in the air system.

Whereas the preferred form of the invention has been shown and described herein, it should be realized that there may be many modifications, substitutions and alterations thereto.

The embodiments of the invention in which an exclusive property or privilege is claimed are defined as follows:

1. A gladhand and automatically-opening dirt protection plug including a gladhand body, a chamber within said body, an air outlet port in communication with said chamber, a seal positioned in said air outlet port, an elongated cylindrical dirt protection plug movable in said chamber toward and away from said seal to open and close said outlet port, said plug having a nose at one end thereof which penetrates said seal in an outlet port closing position, a spring positioned within said chamber and coaxial with said plug for urging said plug toward a closing position with said outlet port seal, an air inlet port in said body, a shutoff valve positioned within said body between said inlet port and said chamber, said plug having a peripherally extending surface closely adjacent the other end of said cylindrical plug and communicable with said air inlet, a collar within said chamber having a cylindrical extension for mounting said plug for reciprocal movement, a space between said peripherally extending plug surface and said collar, air passage means in said collar connecting said space and said plug surface with said shutoff valve, said air inlet being connected to said passage means and to said plug surface when said shutoff valve is open to provide air pressure at said surface to cause said plug to move against said spring and away from said seal to an open position.

* * * * *